June 30, 1925.
S. G. BAITS
1,543,659
COMBINED SPRING SHACKLE AND SHOCK ABSORBER
Filed Jan. 8, 1923
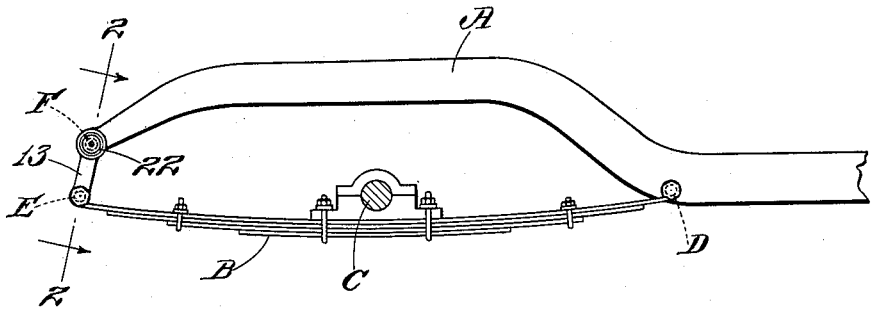
Fig.1.
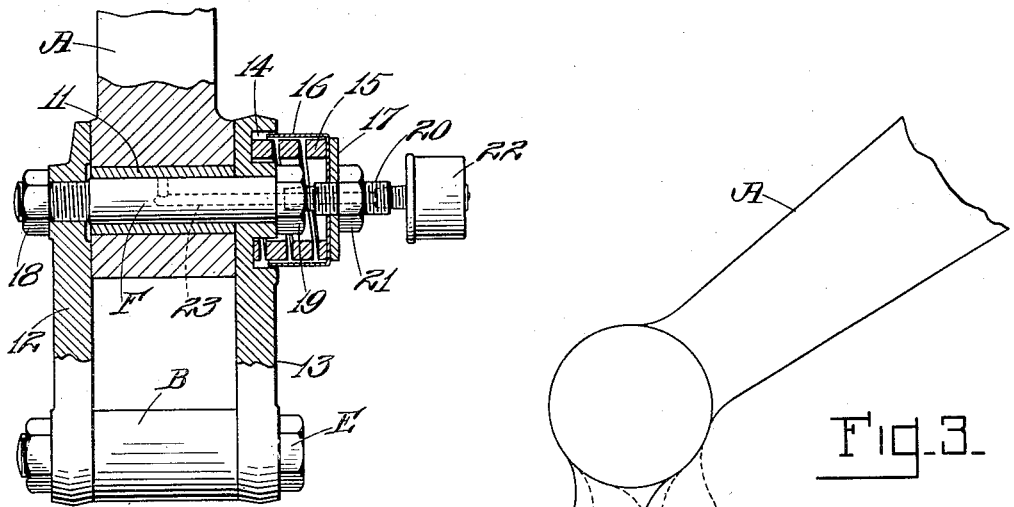
Fig.2.
Fig.3.
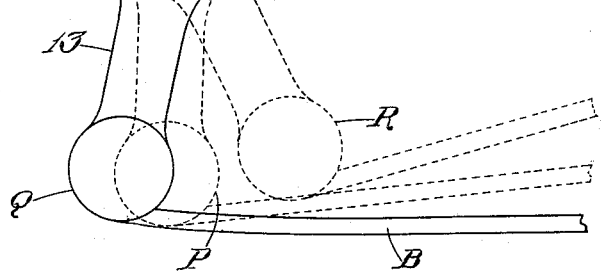
INVENTOR:
Stuart G. Baits
by Macleod, Calvin, Copeland P Dike
Attys.

Patented June 30, 1925.

1,543,659

UNITED STATES PATENT OFFICE.

STUART G. BAITS, OF DETROIT, MICHIGAN, ASSIGNOR TO HUDSON MOTOR CAR COMPANY, OF DETROIT, MICHIGAN, A CORPORATION OF MICHIGAN.

COMBINED SPRING SHACKLE AND SHOCK ABSORBER.

Application filed January 8, 1923. Serial No. 611,279.

*To all whom it may concern:*

Be it known that I, STUART G. BAITS, a citizen of the United States, residing at Detroit, county of Wayne, State of Michigan, have invented a certain new and useful Improvement in Combined Spring Shackles and Shock Absorbers, of which the following is a specification, reference being had therein to the accompanying drawings.

As is well known to those skilled in the art, the ordinary spring suspension of a motor vehicle does not produce satisfactory riding qualities on roads which differ in their characteristics. Accordingly, it has been customary to provide shock absorbers, snubbers, rebound-retarders, supplementary springs, and like devices having various methods of operation, the object being to improve the action of the springs.

Devices of this character are subject to the objection that if adjusted for proper operation on roads of one kind, they will not operate satisfactorily on roads of another. For instance, a shock absorber adjusted for use on roads where smooth macadam and concrete surfaces predominate will be found altogether unsatisfactory in another section of the country where dirt and sand or clay roads prevail. The result is that in different portions of the country, shock absorbers of different types are required. Devices of this character are also very expensive and are usually accessories and not an integral part of the vehicle.

Accordingly, the object of my present invention is to provide a shock absorber which shall be an integral part of the vehicle and which can be easily and quickly adjusted by the user to suit roads of different characteristics.

The device embodying my invention is exceedingly cheap and simple and adds very little to the first cost of the vehicle.

A valuable feature of my invention is the combination of the parts comprising the shock absorber with the spring shackle and frame member of the vehicle so that friction between the several parts tends to control the action of the springs, provision being made for regulation of the amount of friction. Another feature is the arrangement of the parts so that the device will produce relatively greater damping effect for oscillations of the spring of wide amplitude than for those of narrow amplitude.

The invention will be fully understood from the following description when taken in connection with the accompanying drawings, and the novel features thereof will be pointed out and clearly defined in the claims at the close of this specification.

In the drawings—

Fig. 1 is a side elevation of the rear end of an automobile frame and spring showing the application of the shock absorber embodying my invention.

Fig. 2 is a section on line 2—2 of Figure 1.

Fig. 3 is a diagram showing the operation of the device.

Referring now to the drawings, the frame of the vehicle is shown at A and has the usual rearwardly extending horns, only one of which is shown in the drawings. This is pierced by a hole for the reception of a shackle bolt and is provided with a bushing 11. The vehicle spring is shown at B and the axle at C. The spring is shown as connected at its front end to the frame at the point D. At F is shown the upper spring shackle bolt, and at E is shown the lower shackle bolt.

At 12 and 13 are shown two spring shackles, the inner faces of which rest against the sides of the horn of the frame A. The upper shackle bolt F is provided with a head 19 at its outer end, the opposite end thereof being in threaded engagement with the shackle 12, and locked thereto by a nut 18. The shackles 12 and 13 being separate members, their adjustment is made by screwing the bolt F in or out of the shackle 12 by means of the head 19. In practice, I provide the horn A with large bearing surfaces and enlarge the corresponding parts of the spring shackles so as to give a large frictional area.

The outside spring shackle 13 is cut away to provide an annular space 14 in which is seated a heavy spiral spring 15. This spring is covered by a casing 16 outside of which is a washer 17. The upper shackle bolt F is tapped, as indicated in dotted lines, and a hollow stud 20 inserted. This stud carries another adjusting nut 21 which screws against the washer 17 and thus compresses the spring 15, the casing 16 permitting this adjustment by the sliding joint which it makes with the annular space 14. By turning the nut 21, the pressure exerted by the spring shackles 12 and 13 against the sides of the horn of the frame A can be varied as required. For rough roads a considerably greater pressure will be employed than on smooth roads. Into the end of the stud 20 is screwed an oil cup 22, and there are suitable oil passages 23 through the stud 20 and shackle bolt F so that proper lubrication is supplied.

The device embodying my invention is particularly satisfactory in operation because equal increments in spring deflection do not produce equal increments in friction, and consequently in the damping effect of the shock absorber. This is illustrated in Figure 3, in which figure three positions of the spring shackle and three positions of one spring leaf are shown. In the position Q, the spring is substantially flat and the shackle is shown with its lower end slightly at the rear of the vertical position. If a given deflection of the spring forces the spring shackle forward to the position P and if this is compared with another position R on the spring shackle, it will be found that the change in position of the shackle increases more rapidly than the deflection of the spring. Thus a deflection of the spring which is four times as great as a given deflection will be found to produce much more than four times the angular movement of the spring shackle. Accordingly, the damping effect which is proportional to the angle through which the spring shackle moves is relatively greater for large deflections of the spring than for smaller ones. This fact greatly improves the riding qualities of the vehicle since the oscillation of the vehicle is checked more strongly for the large deflections on rough roads which produce large spring deflections than on smooth roads which produce small spring deflections. Thus, on a brick pavement where there are a large number of small differences in level, the corresponding spring deflections will be very small, and there will be but little damping effect exerted by the shock absorber. Under these conditions, the springs have almost entire freedom of movement. On the other hand, on a rough country road where the deflections are considerable, the springs are checked strongly by the large damping effect produced by wide oscillations of the springs. The effectiveness through the entire range of movement of the shock absorber can be increased by setting up the adjusting nut 21.

It will be noted that the shackle bolt F and nut 18 thereon provide means, entirely independent of the spring 15 and nut 21, for securing the shackles to the frame and for taking up any looseness between these parts, thereby permitting complete independence of adjustment of the spring, and holding the parts in proper assembled relation irrespective of the condition of the latter.

The shock absorber embodying my invention adds almost nothing to the cost of the vehicle since the only additional parts required are the spring and casing and adjusting nut.

What I claim is:—

1. The combination with the frame and spring of a motor vehicle, of a shackle connecting the said parts, there being a frictional contact between the shackle and the frame, a spring acting against said shackle to force the latter against the proximate face of said frame to increase the friction between said parts, and means independent of said spring for securing said shackle to said frame.

2. The combination with a frame and a spring of a motor vehicle, of a shackle connecting said parts, there being a frictional contact between the shackle and the frame, a spring acting against said shackle, means for compressing said spring to cause the same to force said shackle against the proximate face of said frame to increase the friction between said parts, and means independent of said spring for securing said shackle to said frame.

3. In combination with the frame and spring of a motor vehicle, of a shackle connecting said parts, there being frictional contact between the shackle and the frame, means including a shackle bolt and a nut thereon for securing said shackle to said frame, a spring acting against said shackle, and independent means on said shackle bolt for compressing the spring against the proximate face of the shackle to increase the friction between the shackle and the frame.

4. In combination with the frame and spring of a motor vehicle, shackles on opposite sides of said frame and a bolt connecting them, a spring and means acting thereon to hold the shackles with a yielding pressure against the sides of the frame and thereby to produce an adjustable frictional contact which exerts a damping effect on the oscillations of the spring, and means independent of said spring for securing said shackles to said frame.

5. In combination with the bracket of the frame of an automobile, of a spring, shackles connecting the spring and the bracket, there being frictional bearing surfaces between said shackles and the bracket, a shackle bolt and a nut thereon for securing said shackles to said frame, a tubular stud secured to the shackle bolt, a spring surrounding said shackle bolt and screw-threaded means on said stud for compressing the spring and thereby regulating the pressure exerted by the proximate faces of the shackles on the corresponding faces of the bracket.

6. In a device of the character described, the combination with a bracket, of a pair of shackles on opposite sides of the bracket, a shackle bolt, and a nut thereon for securing said shackles to said bracket, one of said shackles being provided with an annular pocket surrounding said shackle bolt, a spring in said pocket, a housing outside said spring and extending into said pocket, and means on said shackle bolt for compressing the spring, and thereby varying the pressure exerted by the sides of the shackle on the sides of the bracket.

7. In combination, the bracket of the frame of a motor vehicle, a spring the forward end of which is pivoted to the frame, a pair of spring shackles connecting the rear end to the bracket, a shackle bolt and a nut thereon for securing said shackles to said bracket, a spring surrounding the shackle bolt, and means on the said shackle bolt for varying the pressure exerted by the shackles against the sides of the bracket, said parts being arranged and constructed so that the lateral movement of the shackles for the large deflections of the spring is proportionally greater than the lateral movements produced by the small deflections of the spring.

8. In combination, the bracket of the frame of a motor vehicle, a spring, a pair of spring shackles connecting said parts, one of said shackles having an annular space around the shackle bolt hole, a shackle bolt, and a nut thereon for securing said shackles to said bracket, a coiled spring on said bolt, one end of which is in the said annular space, a casing surrounding said spring and extending into said space, and independent means on said shackle bolt for compressing said spring and thereby varying the pressure exerted by the shackle on the sides of the bracket.

9. In combination with a horn of the frame of an automobile, of a spring, shackles connecting the spring and the horn, said shackles being bolted in position, a spring surrounding one end of the shackle bolt and the head thereof, and independent means for compressing the spring, thereby varying the pressure exerted by the sides of the shackle on the sides of the horn.

10. In combination with the frame, a spring of a motor vehicle, shackles connecting said parts, a shackle bolt screw-threaded into one of said shackles and having a head contacting with the other of said shackles, a spring surrounding said bolt, and independent means on the said shackle bolt for compressing the said spring against the outer face of the proximate shackle to increase the friction between the contacting faces of both said shackles and the frame.

In testimony whereof I affix my signature.

STUART G. BAITS.